United States Patent Office 2,990,044
Patented June 27, 1961

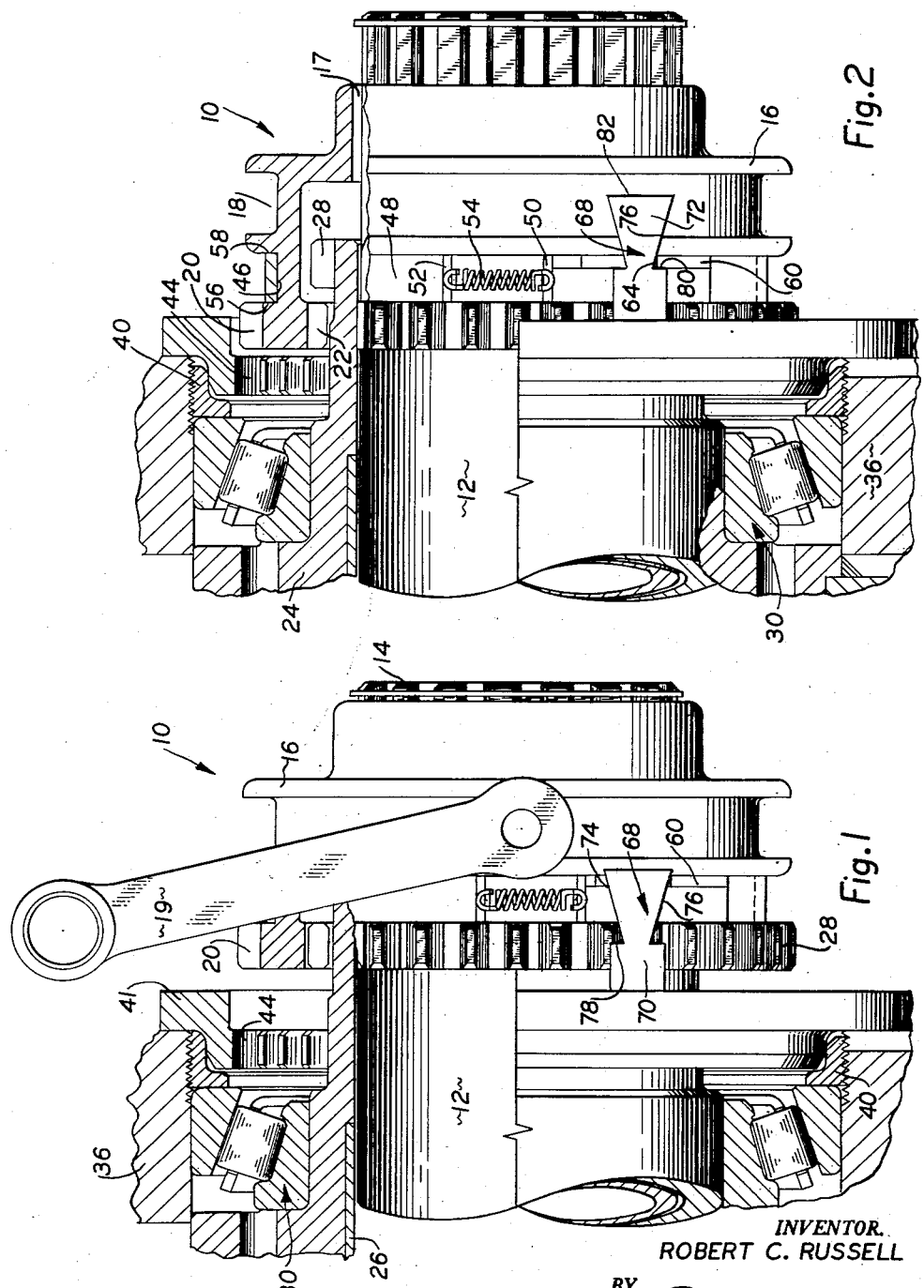

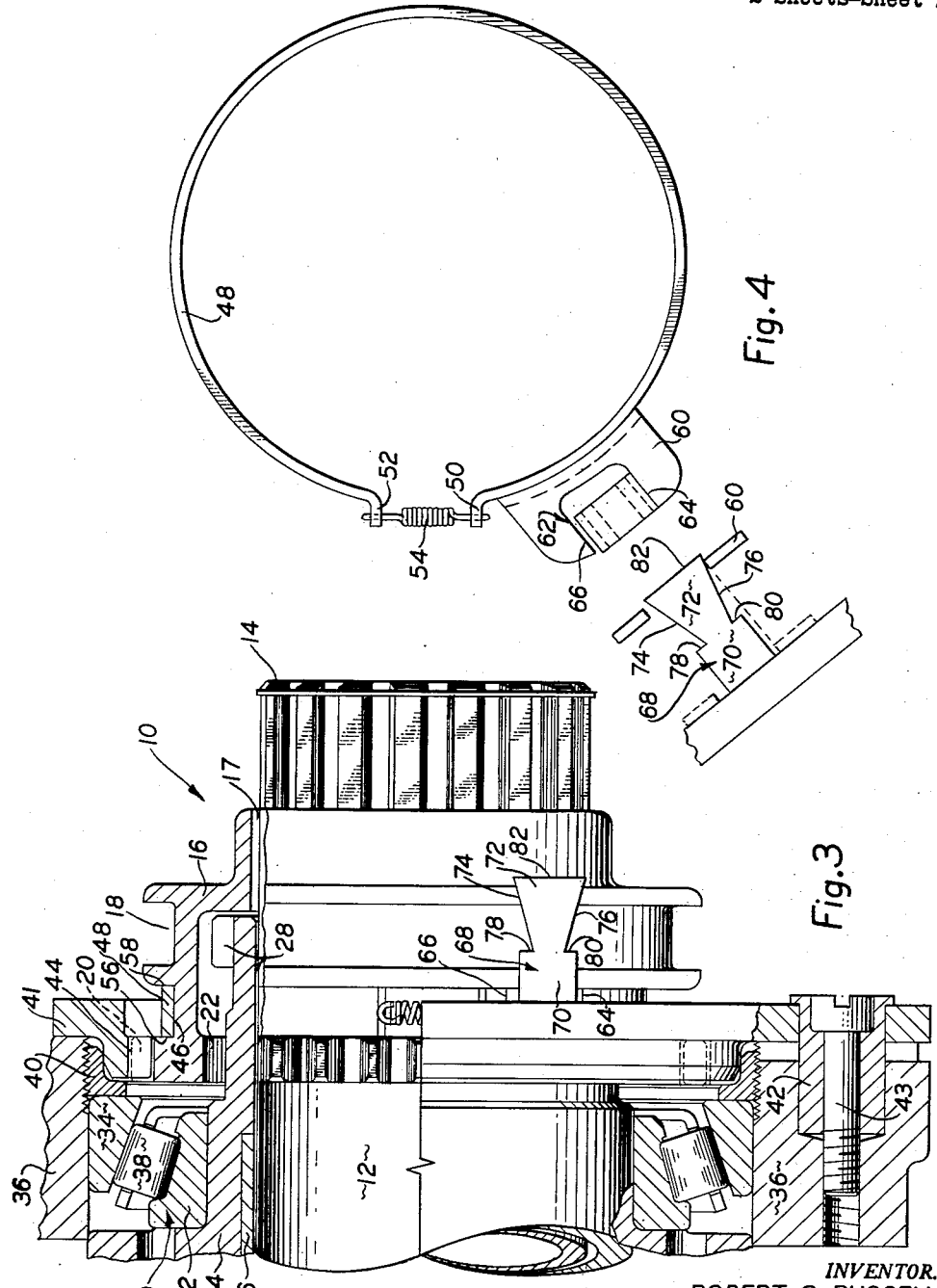

2,990,044
SYNCHRONIZING MEANS
Robert C. Russell, Shaker Heights, Ohio, assignor to Eaton Manufacturing Company, Cleveland, Ohio, a corporation of Ohio
Filed Aug. 28, 1957, Ser. No. 680,894
4 Claims. (Cl. 192—53)

The present invention relates to a positive type synchronizing means for two relatively rotatable elements. In blocker devices heretofore known for relatively rotatable elements which are adapted for positive engagement, the blocking means has served only to reduce the speed differential to a minimum so that the possibility of serious damage to the device would be eliminated during any one operating cycle. However, when the prior art devices have been repeatedly operated, the corners and engaging surfaces of the teeth would wear at a very rapid rate due to even a very slight asynchronous condition which necessitated frequent replacement and repairs.

The present invention overcomes difficulties heretofore known by providing means to positively prevent engagement of the relatively rotatable positive engaging surfaces until a precise synchronous condition is attained. This result is accomplished by a simple, efficient, and smooth operating synchronizing structure.

It is an object of this invention to provide a positive synchronizing means which prevents engagement of relatively rotatable members until a synchronous condition is reached.

Another object is to provide a synchronizing means which eliminates any sharp or harmful impact on the corners or engaging surfaces of toothed relatively rotatable, engageable members.

Still another object is to provide a synchronizing means which does not prevent engagement when the rotating device to which it is applied is in a static position, thus eliminating the necessity of rotating one of the members relative to the other to effect engagement under this condition.

Yet another object is to provide a synchronizing mechanism wherein relatively rotatable positive engaging elements are disposed for immediate engagement after a synchronous condition is attained.

Still another object is to provide a synchronizing mechanism which prevents wear of positive engaging elements and which is simple and effects a smooth and quiet engagement.

Other objects and advantages will become apparent from the following description in which reference is made to the drawings, in which:

FIGURE 1 is a view of the device with the elements which are to be synchronized for engagement shown in a disengaged position.

FIGURE 2 illustrates the device in a neutral condition.

FIGURE 3 shows the parts with the elements to be synchronized in an engaged position, and FIGURE 4 is a detailed showing of the blocker synchronizing means.

Briefly, this invention is comprised of a pair of relatively rotatable members, each of which is provided with positive tooth type engaging means so that the two members can be selectively fixed for conjoint rotation or be fixed from rotation, depending upon whether the device is to be used as a clutch or brake means. One of the members includes an axially projecting lug having angular side wall portions and the other of said members is provided with a biased means which is rotatable with the other of said members by friction means and constrained to move longitudinally with the other of said members, and is capable of relative rotation with respect to the other member under certain operating conditions. The friction means has a radially projecting slot means which is cooperatively disposed with the annular walls of the aforementioned lug and flat wall portions disposed substantially normal to the axis of rotation. When the members are rotating relative to each other and a shift is attempted, one of the slot walls which projects from the friction means abuts one of the flat wall portions on the projecting lug, thus preventing further longitudinal movement of the members until there is reversal in the direction of relative rotation and the projecting wall slot is moved rotatably away from the flat wall, thus allowing the completion of the shift.

Referring to the drawing for a more detailed description of the device, a clutch and brake device 10 is illustrated. It is to be understood that this structure is merely exemplary and the novel synchronizing means herein can be applied to individual clutches or brakes, rather than a combination clutching and braking device. This structure is illustrated because it clearly sets forth the advantages of the novel structure disclosed herein. A shaft 12 has an end portion with longitudinal splines 14 disposed therein. A shiftable sleeve 16 is adapted to be longitudinally movable relative to shaft 12 and constrained for rotation therewith by means of internal splines 17 which cooperate with external splines 14 on shaft 12. A collar portion 18 of shiftable sleeve 16 is adapted to receive a shifting means, such as a bifurcated fork 19, shown in FIGURE 1, to effect selective reciprocation of sleeve 16. The sleeve is also provided with an annulus of external teeth 20 and an annulus of internal teeth 22 which are substantially axially coextensive with each other.

A rotatable sleeve shaft 24 is disposed in encompassing relation with shaft 12 and a bushing means 26 disposed in a recess provided in the internal wall of sleeve 24. The unsupported end of sleeve shaft 24 is also provided with an annulus of external teeth 28 which are adapted to be engageable with internal teeth 22 on shiftable sleeve 16 when the shiftable sleeve is moved to an appropriate position.

A support and thrust bearing 30 is comprised of an inner race 32 which surrounds rotatable sleeve 24 and abuts the shoulder portion thereof. An outer race 34 is disposed within a frame portion 36 and a plurality of bearing elements 38 are retained between races 32 and 34. Bearing adjustor 40 is threadingly supported in frame portion 36 and is adapted to be moved longitudinally to effect an adjustment of bearing 30. A frame or reaction plate 41 is attached to frame portion 36 by means of locating sleeve 42 and cap screw 43. The reaction plate is provided with an annulus of internal teeth 44 which are adapted to be engageable with external teeth 20 provided on shiftable sleeve 16 when the sleeve is disposed in the appropriate longitudinal position.

Shiftable sleeve 16 is provided with an annularly recessed portion 46 disposed axially between collar portion 18 and external teeth 20. A blocker band 48 encircles annularly recessed portion 46 and is provided with upturned ends 50 and 52 which are resiliently biased together by a tension spring 54. The frictional load on the blocker band exerted by spring 54 is relatively light because the blocker band is not required to carry any torsional load and under certain operating conditions, blocker band 48 rotates relative to sleeve 16. In this position, end wall portions 56 and 58 prevent relative longitudinal movement between shiftable sleeve 16 and blocker band 48. A blocker arm 60 is attached integral with blocker band 48 and has a slot portion 62 disposed substantially centrally of the blocker arm 60. Side wall portions 64 and 66 form a part of the slot 62.

A stop lug 68 is attached to reaction plate 41 by a weld or other suitable means and is disposed in a manner so that it lies within blocker arm slot 62, both laterally and circumferentially. Stop lug 68 is comprised of a rectangularly shaped base portion 70 and an end portion 72 which is illustrated as being in the shape of an isosceles trapezoid having side portions 74 and 76 disposed at equal angles to the axis of rotation of the device. Stop surfaces 78 and 80 are disposed normal to the axis of rotation at the junction point between the base portion and the end portion of stop lug 68. It is to be noted that the width of stop lug 68 across end face 82 is greater than the width of base portion 70 of the lug, the reasons for which will become more apparent when an operating cycle is considered. In order to more clearly understand the operation of the device, a typical operating cycle is set forth as follows.

Referring to FIGURE 1, assume rotatable sleeve shaft 24 is driven from a source, not shown, and shiftable sleeve 16 is disposed in a position wherein teeth 22 of shiftable sleeve 16 are in driving engagement with teeth 28 of rotatable sleeve shaft 24. Shift sleeve 16 is actuated by a yieldable preloading means (not shown) in a manner such that when shift sleeve 16 encounters an interference with the blocker means before a predetermined moment is completed, the yieldable means preloads the shift sleeve so that there is a steady force applied to shift sleeve 16 in opposition to the interference; when the interference is removed, shift sleeve 16 completes the predetermined movement due to the preload force. A typical preload type operation is shown in U.S. Patent 2,462,779. When it is desired to shift sleeve 16 to a position wherein teeth 20 are engaged with teeth 44 of reaction plate 41, lever means 19 is rotated clockwise until blocker interference is encountered as illustrated in FIGURE 2. Such a position is designated as neutral because sleeve 16 is in a disconnected relationship with sleeve shaft 24 and reaction plate 41. At this time, shaft 12 is decelerating in a clockwise direction when viewed from right to left in FIGURE 2 and side wall portion 64 of blocker 60 is biased against side portion 76 of stop lug 68 and shiftable sleeve 16 is rotating relative to blocker band 48 through the friction connection between the band and annular surface 46 of sleeve 16. Side wall portion 64 of blocker arm 60 abuts stop surface 80 of stop lug 68 and prevents further longitudinal movement of sleeve 16 relative to shaft 12 until the deceleration of shaft 12 diminishes to zero, and the shaft commences rotation in the opposite direction due to the action of gearing which is not shown and forms no part of the present invention. Shiftable sleeve 16 and blocker band 48 also rotate in the opposite direction, thus moving side wall portion 64 of arm 60 circumferentially away from stop surface 80 of stop lug 68. At this time, all interference to completion of the shift has been removed and shiftable sleeve 16 is free to continue moving longitudinally to a position wherein teeth 20 and 44 become fully engaged. Whenever shaft 12 is initially rotating in the opposite direction, the blocker arm functions in an identical manner except that side wall portion 66 abuts stop surface 78 to prevent completion of a shift until a synchronous condition is reached. It is to be noted that there is no critical relationship between the width of blocker arm slot 62 and the width of stop lug 68 since it is necessary only that blocker arm 60 and stop lug 68 be able to move circumferentially relative to each other a limited amount.

In devices heretofore known, it has been necessary to have relative rotation between the members before an engaged condition could be effected. With this device, if it is desired to move shiftable sleeve 16 from a position wherein teeth 22 and 28 are engaged to a position wherein teeth 20 and 44 are engaged, none of the members need be rotating due to the novel structure of the blocker means. Referring to FIGURE 1, when teeth 22 and 28 are engaged, blocker arm 60 is disposed adjacent end wall 82 of stop lug 68. In this position, side wall portions 64 and 66 of blocker arm 60 are disposed in circumferentially spaced relation to base portion 70 because end wall 82 is wider than base portion 70 of stop lug 68. Therefore, when none of the members are rotating and shift lever 19 is moved clockwise from a position wherein teeth 22 and 28 are in engagement, as viewed in FIGURE 1, shiftable sleeve 16 can be moved, without interference, to a position wherein teeth 20 and 44 are engaged, due to the novel configuration of stop lug 68 which disposes blocker arm 60 and stop lug 68 in a non-blocking position when sleeve 16 is moved from right to left, as viewed in FIGURE 1. This novel feature is of great importance and renders it unnecessary to rotate sleeve 16 relative to reaction plate 41 to effect an engagement of these members when the device is not rotating.

As heretofore stated, this novel blocking structure can be applied to either a clutching or braking device and requires only that the relative direction of rotation of the members be changed. When this blocker means is utilized with a clutching device, the stop lug is fixed for rotation with one of the members and the blocker band is frictionally rotatable with the other of the rotatable members.

It is also noted that if synchronizing means is required in only one direction of rotation, stop lug 68 need only be provided with one angular side portion 74 or 76.

It is seen from the foregoing description that a novel blocking means has been provided which insures positive blocking until the members to be engaged are rotating synchronously and further, that a blocking means has been provided which is operative in either direction of rotation of the members to be synchronized. Also, complete shifting of the members can be effected when the device is in a static position since a novel means has been disclosed which allows for engagement of the members when neither member is rotated and provides positive blocking means when the members are rotating asynchronously.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited therefore, only by the broad scope of the appended claims.

I claim:
1. In a mechanism of the class described, a first member having circumferentially spaced tooth means thereon, a second member having circumferentially spaced tooth means thereon, said members being relatively rotatable with respect to each other, said tooth means on said first member and said tooth means on said second member being selectively engageable with each other, blocker means disposed radially outward of said tooth means and being operatively connected to said first member, said blocker means having a surface portion disposed at an angle with respect to the axis of said relatively rotatable members and a blocking surface disposed normal to said axis, friction means comprising an external band being axially confined and in resilient gripping engagement with said second member and selectively rotatable with respect thereto, radially projecting arm means integral with said friction means and being selectively disposed in abutting relationship with said blocking surface whereby engagement of said tooth means is prevented during asynchronous rotation of said members.

2. A synchronizing means comprising a pair of relatively rotatable members being selectively axially engageable for conjoint rotation, a stop lug fixed to one of said members, said stop lug having a base portion, an end portion wider than said base portion, a stop surface formed on said base portion, an angular wall portion on said end portion disposed at an acute angle with respect to the direction of movement which effects engagement of said members, a blocker means connected for axial movement with the other of said members and disposed to frictionally rotate therewith, said blocker means comprising a blocker arm and a blocker band connected to said blocker arm, said blocker arm having a wall portion disposed adjacent said angular wall portion of said lug and selectively positionable in axial abutting relationship with said stop surface and being movable to a circumferentially spaced position with respect to said stop surface when said blocker arm is moved axially away from said stop surface, clutch teeth disposed on each of said members in radially spaced relation with said stop lug and adapted to be engageable with each other when said blocker arm wall portion is circumferentially spaced from said stop surface.

3. A synchronizing device comprising a pair of relatively rotatable members, circumferentially disposed toothed portions formed on said members and being selectively axially engageable to effect a torque transmitting relationship between said members, a lug means positioned in radially spaced relation with said toothed portions and having a base portion fixed to one of said members and an end portion having an angular wall portion disposed at an acute angle with respect to the direction of movement which effects engagement of said members, one end of said angular wall portion being disposed within said base portion and the other end of said angular wall portion being disposed outside of said base portion with respect to the circumference of one of said members, a stop surface disposed axially between said base portion and said angular wall portion, blocker means fixed for axial movement with the other of said members and frictionally connected for rotation therewith, a blocker arm portion of said blocker means being disposed circumferentially adjacent said angular wall portion and selectively positionable in axial abutting relationship with said stop surface and being movable to a circumferentially spaced position with respect to said stop surface when said blocker arm portion is moved axially away from said stop surface whereby said members are relatively longitudinally movable into torque transmitting relationship when said blocker arm is circumferentially spaced from said angular wall portion and said stop surface.

4. A synchronizing device comprising a pair of relatively rotatable members, selectively engageable toothed portions circumferentially disposed on said members, a lug means positioned in radially spaced relation with said toothed portions and having a base portion fixed to one of said members and an end portion axially spaced from said base portion, an angular wall portion formed on said end portion and disposed at an acute angle with respect to the axis of rotation of said members, a stop surface formed on said base portion and disposed substantially normal to the axis of rotation of said members, one end of said angular wall portion being circumferentially spaced from said base portion in respect to the circumferential disposition of said toothed portions, blocker means frictionally engaged with the other of said members and connected for conjoint axial movement therewith, said blocker means having a blocker arm cooperatively disposed adjacent said angular wall portion, said blocker arm being positioned axially coincident with an end of said angular wall portion remote from said stop surface when said toothed portions are disengaged so that said blocker arm is moved to a circumferentially spaced position with respect to said stop surface and said toothed portions being relatively longitudinally movable into engagement when said blocker arm is circumferentially spaced from said stop surface.

References Cited in the file of this patent

UNITED STATES PATENTS

| | | |
|---|---|---|
| 1,935,965 | Wahlberg | Nov. 21, 1933 |
| 2,488,044 | Voigt | Nov. 15, 1949 |
| 2,518,735 | Wemp | Aug. 15, 1950 |